United States Patent
Cerruti et al.

(10) Patent No.: US 9,453,724 B2
(45) Date of Patent: Sep. 27, 2016

(54) DETECTION DEVICE, AND CORRESPONDING SYSTEM FOR DETERMINING THE ORIENTATION OF THE WHEELS OF A VEHICLE

(75) Inventors: Piero Cerruti, Turin (IT); Fausto Manganelli, Casalecchio di Reno (IT)

(73) Assignee: SPACE S.R.L. CON UNICO SOCIO (IT)

( * ) Notice: Subject to any disclaimer, the term of this patent is extended or adjusted under 35 U.S.C. 154(b) by 728 days.

(21) Appl. No.: 13/977,544

(22) PCT Filed: Dec. 30, 2011

(86) PCT No.: PCT/IB2011/056032
§ 371 (c)(1),
(2), (4) Date: Sep. 12, 2013

(87) PCT Pub. No.: WO2012/090187
PCT Pub. Date: Jul. 5, 2012

(65) Prior Publication Data
US 2014/0002638 A1    Jan. 2, 2014

(30) Foreign Application Priority Data
Dec. 30, 2010   (IT) .............. TO2010A1094

(51) Int. Cl.
*G01B 11/25* (2006.01)
*G01B 11/275* (2006.01)

(52) U.S. Cl.
CPC ..... *G01B 11/2755* (2013.01); *G01B 2210/143* (2013.01); *G01B 2210/30* (2013.01)

(58) Field of Classification Search
CPC .................. G01B 11/2755; G01B 2210/143; G01B 2210/30
USPC ............................. 33/203, 203.18
See application file for complete search history.

(56) References Cited

U.S. PATENT DOCUMENTS

| | | | |
|---|---|---|---|
| 5,724,743 A * | 3/1998 | Jackson ............. | G01B 11/2755 33/203.18 |
| 5,748,301 A * | 5/1998 | Muller ............... | G01B 11/2755 33/286 |
| 5,949,477 A | 9/1999 | Hoglin | |
| 6,701,081 B1 | 3/2004 | Dwyer et al. | |
| 7,313,869 B1 * | 1/2008 | Rogers ............... | G01B 11/2755 33/203.18 |
| 2003/0142294 A1 * | 7/2003 | Jackson ............... | G01B 5/0025 356/139.09 |

(Continued)

FOREIGN PATENT DOCUMENTS

| | | |
|---|---|---|
| CN | 101334276 | 6/2010 |
| EP | 1887317 | 2/2008 |

*Primary Examiner* — G. Bradley Bennett
(74) *Attorney, Agent, or Firm* — The Belles Group, P.C.

(57) ABSTRACT

A detection device for determining the orientation of a first and a second wheel of a vehicle, the wheels being arranged on a first side of the vehicle with respect to a longitudinal axis thereof. The device is set laterally with respect to the vehicle on the first side, between the first and second wheels, and has a first and a second image-acquisition elements located on a base support having a respective viewing area for acquiring images of a first and a second target coupled to the first and second wheels. A displacement unit is operatively coupled to the first and second image acquisition elements for rotating them simultaneously through the same angle of rotation so as to adapt their viewing area to the position of the first and second targets. The detection device comprises additional alignment sensors located on the base support for measuring calibration parameters of the base support.

20 Claims, 9 Drawing Sheets

(56) References Cited

U.S. PATENT DOCUMENTS

| | | |
|---|---|---|
| 2006/0227567 A1 | 10/2006 | Voeller et al. |
| 2008/0289202 A1 | 11/2008 | Kassouf et al. |
| 2009/0027662 A1* | 1/2009 | Rogers ............... G01B 11/2755 356/139.09 |
| 2009/0031782 A1* | 2/2009 | Jackson ............. G01B 11/2755 73/1.75 |
| 2011/0221867 A1* | 9/2011 | Nobis .................. G01B 11/275 348/46 |
| 2013/0194446 A1* | 8/2013 | Cerruti ............... G01B 11/2755 348/222.1 |
| 2013/0307967 A1* | 11/2013 | D'Agostino ....... G01B 11/2755 348/135 |
| 2014/0278226 A1* | 9/2014 | Stieff ................ G01B 11/2755 702/154 |

* cited by examiner

DETECTION DEVICE, AND CORRESPONDING SYSTEM FOR DETERMINING THE ORIENTATION OF THE WHEELS OF A VEHICLE

CROSS-REFERENCE TO RELATED PATENT APPLICATIONS

The present application is a U.S. national stage application under 35 U.S.C. §371 of PCT Application No. PCT/IB2011/056032, filed Dec. 30, 2011, which claims priority to Italian Application No. TO2010A001094, filed Dec. 30, 2010, the entireties of which are incorporated herein by reference.

TECHNICAL FIELD

The present invention relates to a detection device, and to a corresponding system for determining orientation of the wheels of a vehicle.

BACKGROUND ART

Known to the art are systems for determining the orientation of the wheels of a vehicle, in particular a motor vehicle, which enable an automatic measurement of one or more characteristic angles of the wheels, for example the so-called convergence and camber angles, in order to verify proper alignment of the wheels themselves in a reference system fixed with respect to the vehicle. In a known way, in fact, an incorrect alignment, with respect to the design parameters, can cause an excessive or non-homogeneous wear of the tires, and moreover can cause problems in driveability and stability of the vehicle.

Systems for determining orientation of the wheels of a vehicle are in general configured for detecting, via purposely provided detection devices, the spatial orientation of the plane of each wheel with respect to a single orthonormal triad taken as reference (it should be noted that by "plane of the wheel" is here understood the plane in which an outer lateral surface of the wheel lies, for example the surface identified by the corresponding rim) so as to enable appropriate corrective actions to be undertaken for restoring alignment of the wheels.

In particular, some systems envisage the use of devices for detecting the characteristic angles of the wheels, or in any case of appropriate sensitive elements, directly coupled to the wheels of the vehicle via purposely provided engagement tools (the so-called "clamps"), so as to identify the orientation thereof. In this case, to prevent damage to the detection devices, a considerable care is required in their installation on the wheels and moreover during execution of the measurement steps.

Other systems displace the point of observation to outside the vehicle in such a way as to define a reference system (SdR) fixed with respect to that of the attitude, through observation of the angular variations of the wheels by one or more detection devices (the so-called "measuring heads") set in a position external to the vehicle and independent of the orientation of the vehicle itself. In this case, the elements that are applied to the wheels of the vehicle may be altogether passive, and hence be advantageously less delicate and sensitive to damage.

In particular, some systems envisage positioning of the detection devices directly on the hydraulic ramp (designed to raise the vehicle under observation, in a known way), in a lateral position with respect to the vehicle. Other systems envisage positioning of the detection devices in a front position with respect to the vehicle itself, on structures that are fixed or can move independently, which are set at a distance and are separate both from the vehicle and from the hydraulic ramp. In the former case, the image-acquisition devices follow the movements of the hydraulic ramp but, for this reason, the deformations thereof must be compensated dynamically. In the latter case, the image-acquisition devices must follow the movements of the hydraulic ramp so as to maintain pointing on the wheels, but do not need to compensate the deformations thereof.

In any case, said systems generally use appropriate targets coupled to the wheels of the vehicle in such a way as to highlight the rotation and position thereof in space. The detection devices include, in particular, appropriate image-acquisition tools, designed to frame the targets coupled to the wheels and acquire images corresponding thereto, on the basis of which appropriate processing operations are carried out to determine the orientation of each wheel and the mutual alignment.

Targets of a known type usually present a two-dimensional configuration with a plane surface represented on which are two-dimensional images of multiple shapes, which can be recognized by a processing device, which is coupled to the detection devices and generally carries out a so-called "best fit" operation between geometries of two-dimensional images identified on a generically plane surface forming part of the real target and the two-dimensional images that the image-acquisition devices supply in their own reference system. This operation enables dynamic determination of the orientation of the target in space, and hence definition of elementary roto-translations corresponding to the linear and angular movement of each wheel within a single reference system (for example, the reference system of the vehicle). Then, said elementary roto-translations, set in appropriate relation with one another, are used for defining further more complex rotations and translations, which regard more specifically the characteristics of attitude and alignment of the vehicle.

In the use of said systems in a workshop, there may arise cases where the simultaneous visibility, for each side of the vehicle, of the target applied to the front wheel and of the target applied to the rear wheel becomes problematical, and at times impossible, owing to the dimensional characteristics of the vehicle itself (which may vary in a wide range where the track may be comprised, for example, between 1000 mm and 1750 mm, and the wheelbase may be comprised, for example, between 1800 mm and 4100 mm), or else can be jeopardized by an incorrect alignment of the vehicle itself with respect to the measuring area defined by the hydraulic ramp. Consequently, alignment systems of a known type, for covering the wide range of existing vehicles completely, requires intervention of the operator, who must displace each detection device along the hydraulic ramp in an appropriate way to adapt to, or follow, the position of the wheels and of the associated targets.

Said operation may prove complicated, also because it requires a manual displacement of the detection devices, with consequent movement of the corresponding wiring. Moreover, the very operation of displacement may cause accidental damage to the detection devices, thus jeopardizing the operations of measurement or giving rise to errors of measurement in the subsequent detection of the angles of interest.

The patent application No. EP 1 887 317 A1 describes a system for measuring the alignment of the wheels of a vehicle, which envisages use, on each side of the vehicle, of four video cameras, designed to frame, in pairs, a respective wheel and the corresponding target, which has a two-dimensional configuration. Processing of the images is of a stereo type, since it is necessary to process jointly two images of one and the same target, taken from different angles (by the two different video cameras of each pair), to determine the angles of alignment thereof with respect to a reference system. Each video camera is individually mobile and can be displaced with respect to a load-bearing structure, in particular along a respective guide. Said solution is clearly complex to manage and use, given that it requires amongst other things maintenance of the correct mutual positioning of a large number of devices for acquiring the images, and moreover involves complex operations of processing of the images themselves.

Other systems for measurement of alignment, albeit using a smaller number of filming elements, require in any case a stereo processing of the images corresponding to the framed planar targets, for measuring the angles of alignment. In order to acquire stereo images of the respective target and enable an operation of measurement of the angles of alignment, each filming element can be individually displaced so as to assume, in consecutive times, at least two different positions with respect to the target itself. Also said systems consequently prove in general complex to produce and use.

DISCLOSURE OF INVENTION

The aim of the present invention is to provide a detection device and a corresponding system for determining the orientation of the wheels of a vehicle that will enable total or partial solution of the problems highlighted above.

According to the present invention, a detection device and a corresponding system are consequently provided, as described in the annexed claims.

BRIEF DESCRIPTION OF THE DRAWINGS

For a better understanding of the present invention, preferred embodiments thereof are now described, purely by way of non-limiting example and with reference to the attached drawings, in which.

BEST MODE FOR CARRYING OUT THE INVENTION

Figure 1:
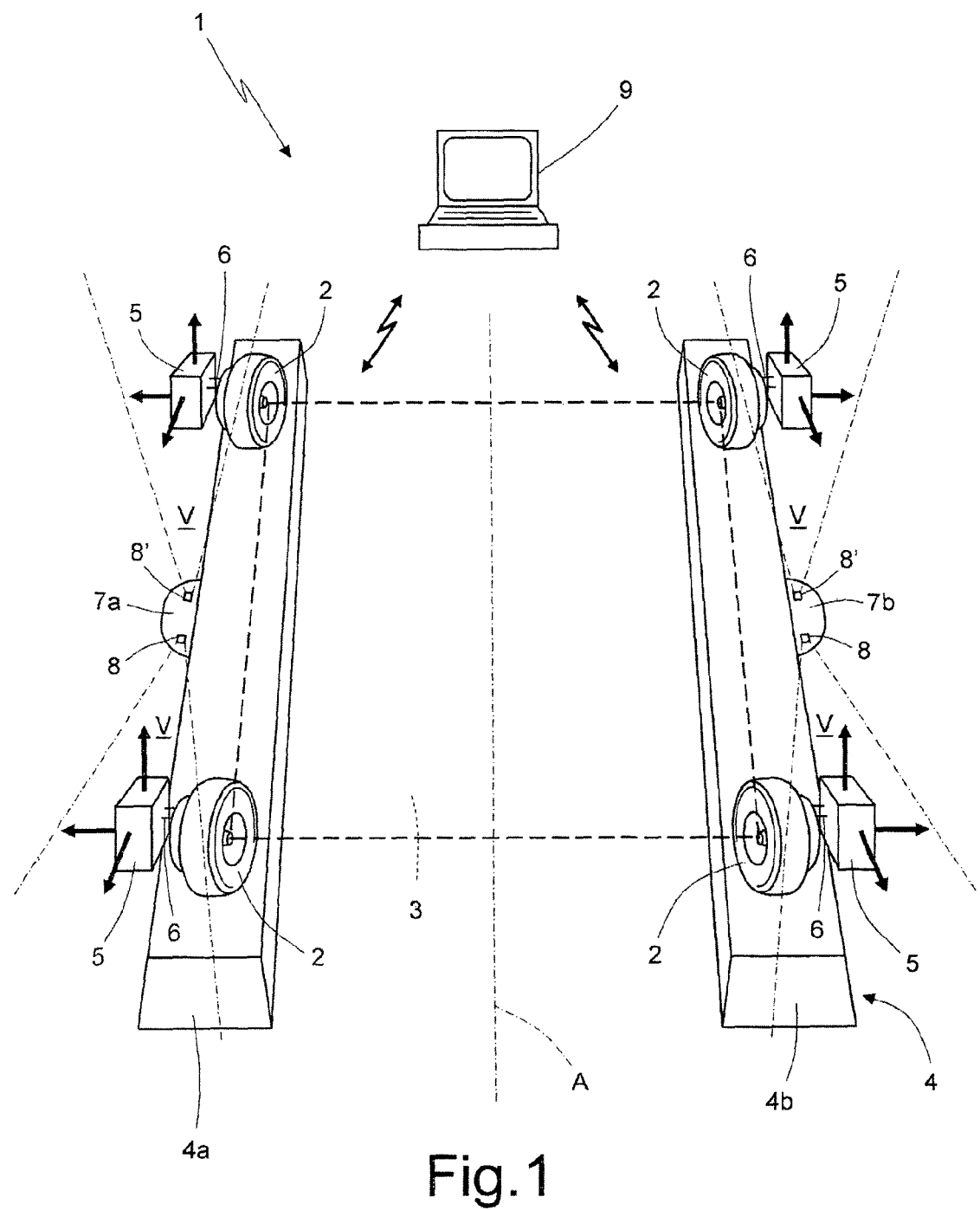
FIG. 1 is a schematic representation of a system for determining the orientation of the wheels of a vehicle, according to one aspect of the present invention.

FIG. 1 is a schematic illustration of a system, designated as a whole by 1, for determining the orientation (and mutual alignment) of the wheels 2 of a vehicle 3 (the shape of which is outlined with a dashed line). In the example illustrated, the vehicle 3 is a motor vehicle provided with four wheels 2, set in pairs on the left and on the right, respectively, with respect to a longitudinal axis A of extension of the vehicle itself. The vehicle 3 is, for example, set on a hydraulic ramp 4, of a type in itself known and not described in detail herein, for example including a first platform 4a and a second platform 4b, set on opposite sides with respect to the longitudinal axis A, and resting on which is a respective pair of wheels 2; the platforms 4a, 4b have a longitudinal extension along the longitudinal axis A and define, in this case, a measuring area for the operations performed by the system 1 (it is, however, evident that the measuring area can be defined by other elements, for example, in the case where the vehicle is set in a so-called "measuring pit").

The system 1 comprises a plurality of targets 5, represented schematically herein, equal in number to the wheels 2, each target 5 being mechanically coupled to a respective wheel 2 via an engagement element, or "clamp", 6. Said engagement element 6 can be, for example, provided as described in the Italian utility models Nos. IT-0000254272 and IT-0000254273, filed in the name of the present applicant.

Each target 5 is advantageously provided as described in the patent application No. PCT WO2011/138662, filed on May 5, 2010 in the name of the present applicant; each target 5 hence has a particular "real" three-dimensional geometry, such as to enable identification of vector quantities set according to a known three-dimensional arrangement, and in particular identification of a triad of orthogonal axes associated to the orientation of the target 5 itself, which can be identified also by processing a single two-dimensional image coming from a single image-capturing element. Each target 5 is constituted by a plurality of target elements, which also have a three-dimensional shape, set so as to form as a whole the three-dimensional structure of the target 5 itself, and have a geometrical shape such as to enable an easy recognition thereof within the two-dimensional images.

Figure 2A:
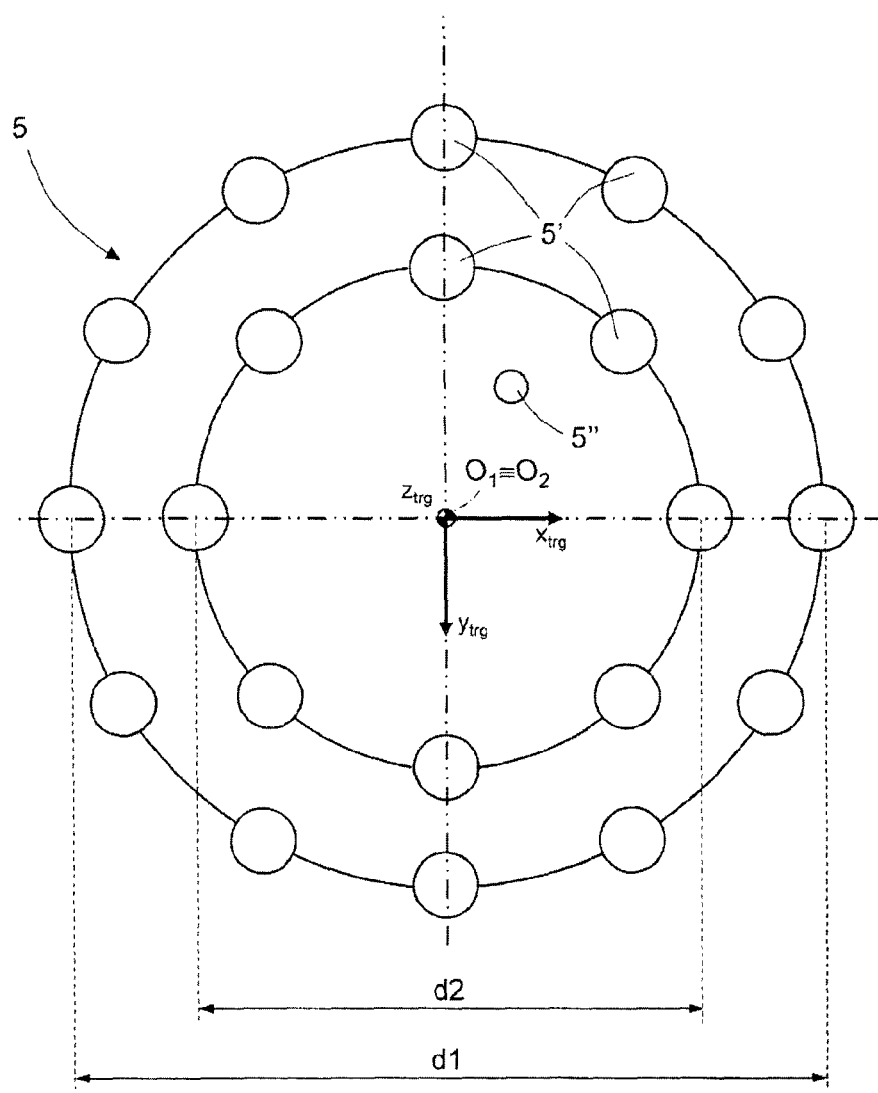
FIGS. 2a-2c are schematic representations of a target associated to a wheel of the vehicle in the system of FIG. 1.
Figure 2B:
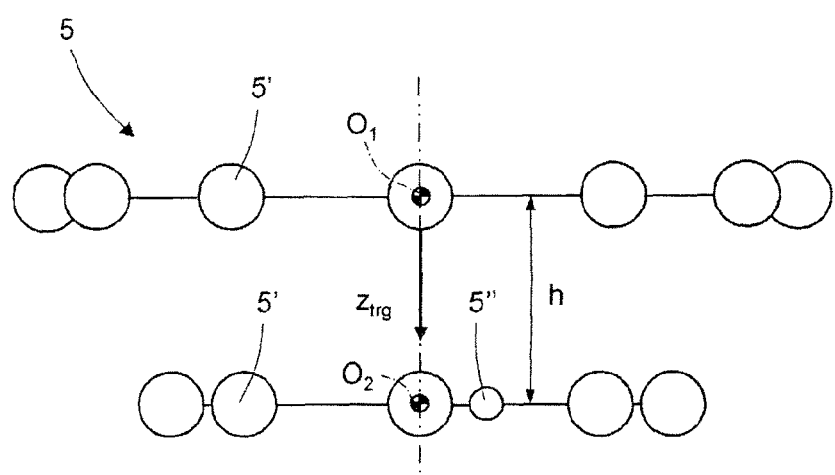

Each target 5, as shown schematically in FIGS. 2a, 2b, is for example constituted by two concentric circular rings of target elements 5', set inside one another (a first, outer, ring having a diameter $d_1$ greater than that of a second, inner, ring having diameter $d_2$). The two circular rings are set in two distinct planes, parallel to one another and set on top of one another, and the respective centres $O_1$, $O_2$ are separated by a distance h. Each target element 5' has a three-dimensional geometrical shape, in particular spherical. Advantageously, said spherical shape is such that the target elements 5' themselves will maintain unvaried their shape within two-dimensional images framed from any angle (within a given angular range), being thus readily identifiable. In particular, the corresponding geometrical centre, in what follows defined as "sphere centre", can be readily identified in said two-dimensional images. In fact, the spheres have characteristics of isotropy both with respect to the shape and with respect to reflection, in particular with respect to a light source coaxial to the elements for capturing the corresponding images.

In greater detail, identified within the target 5 is a triad of vectors, orthogonal to one another, each aligned along a respective axis of a triad of orthogonal axes $x_{trg}$, $y_{trg}$, $z_{trg}$ fixed with respect to the target 5 itself. In particular, a first target vector (along the axis $z_{trg}$) is identified corresponding to the vector joining the two centres $O_1$, $O_2$ of the outer and inner circular rings formed by the target elements 5'. Within the target 5 itself a second target vector and a third target vector are moreover identified as a function of the position of specific target elements 5'. For example, the second target vector corresponds to the vector joining the sphere centres of a first pair of pre-set target elements 5' of the outer circular ring (aligned along the axis $x_{trg}$), whilst the third target vector corresponds to the vector joining the sphere centres of a second pair of target elements 5', once again belonging to the outer circular ring (aligned along the axis $y_{trg}$). In order to facilitate identification of the aforesaid pre-set elements of the target 5' defining the target vectors in the two-dimensional images that are acquired by the image-capturing devices, the target 5 can advantageously comprise one or more reference elements 5" that indicate the orientation thereof, which also have a three-dimensional geometry, and in particular a spherical shape, for example with a diameter smaller than that of the target elements 5' (so as to be easily recognizable).

In use, the target 5 is coupled to a respective wheel 2 of the vehicle 3, by using a purposely provided engagement element 6, in such a way that the plane defined by the axes $y_{trg}$, $z_{trg}$ will approximate the plane parallel to the plane of the wheel itself, and the axis $x_{trg}$ will approximate the normal thereof. The relation between the target reference system and the wheel reference system is guaranteed by construction or by execution of an appropriate calibration procedure.

Figure 2C:
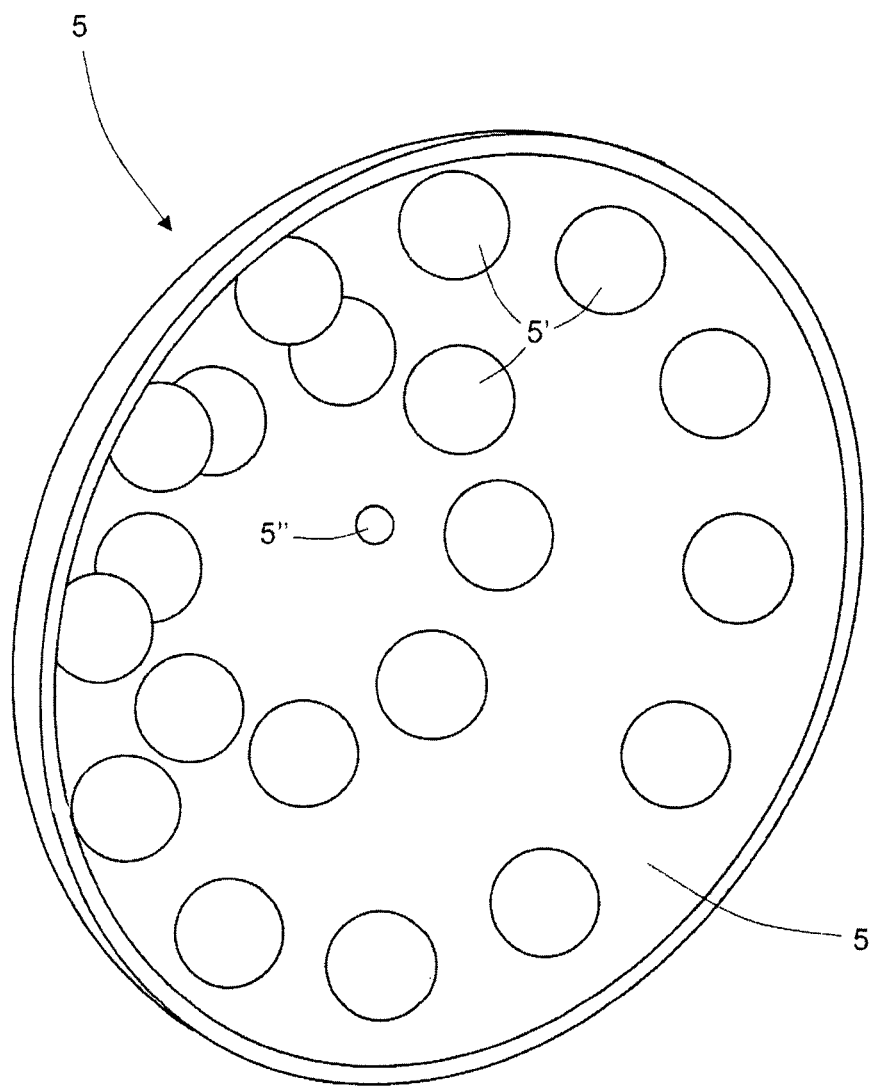

As shown in FIG. 2c, in a possible embodiment of the target 5, the latter comprises a supporting structure S, which defines inside it a concave spherical surface (or a portion of spherical surface) on which the target elements 5' are to be applied (for example, by gluing). For example, the supporting structure S is constituted by a concave spherical cap. Advantageously, said conformation enables a convenient definition of the triad of orthogonal axes associated to the target 5 (which corresponds to a triad of segments, or vectors, which can be identified also on the image plane, where they are measured in pixels). In the embodiment of FIG. 2c, coupled to an edge portion of the supporting structure S, for example by gluing, are the target elements 5' defining the outer circular ring, whilst coupled to a more internal portion of the same supporting structure S, are the target elements 5' defining the inner circular ring. The outer and inner circular rings are in this case set on two sections of a spherical segment subtended by the spherical cap, parallel to one another and orthogonal to the axis of the target. A single reference element 5" is in this case coupled to one and the same supporting structure S, inside the inner circular ring of the target elements 5'. Use of a conformation of the target 5 comprising a supporting structure S shaped like a concave spherical cap, containing inside it the target elements 5', enables identification of the triad of orthogonal vectors associated to the target in a wide angular range of observation (for example, comprised between −30° and +30°).

The system 1 (see again FIG. 1) further comprises a first detection device 7a and a second detection device 7b, which are set laterally with respect to the vehicle 3 and with respect to the area where the vehicle 3 itself is standing on the hydraulic ramp 4, respectively on the right-hand side and on the left-hand side of the vehicle 3 with respect to the longitudinal axis A. The detection devices 7a, 7b are positioned in a fixed way laterally with respect to the vehicle 3 (in a respective detection position) and aligned in a direction transverse to the longitudinal axis A. For example, the detection devices 7a, 7b are rigidly coupled to the hydraulic ramp 4, each to a respective platform 4a, 4b of the hydraulic ramp 4 itself, by means of a respective releasable engagement mechanism (as illustrated hereinafter). Moreover, the detection devices 7a, 7b are positioned so as to be set, along the longitudinal axis A, between the two wheels 2 of the vehicle 3 set on the same side with respect to the longitudinal axis A.

Each detection device 7a, 7b is provided with a first image-acquisition element 8 and a second image-acquisition element 8', which, for example, include a video camera, a photographic camera or a similar image-capturing tool, configured so as to frame, each in a respective viewing area V, the target 5 associated to a respective wheel 2 of the pair of wheels 2 set on the same side of the longitudinal axis A.

The first image-acquisition element 8 is, for example, carried at the front by the corresponding detection device 7a, 7b (with respect to the aforesaid longitudinal axis A) so as to frame a target 5 in a front position (i.e., coupled to the wheel 2 of the front axle of the vehicle 3), whereas the second image-acquisition element 8' is carried at the rear by the same detection device 7a, 7b (in a position opposite to the first image-acquisition element 8 along the longitudinal axis A) so as to frame a respective target 5 in a rear position (i.e., coupled to the wheel 2 of the rear axle of the vehicle 3).

Each image-acquisition element 8, 8' has a given optical aperture (associated to the viewing area V), for example with a conical conformation. Said optical aperture has an angular aperture sufficient to enable a correct framing of the front and rear targets 5 in the case of vehicles having average dimensions of track and wheelbase, and is for example equal to 56°, in a horizontal plane parallel to the plane of the respective platform 4a, 4b (and substantially parallel to the ground), and equal to 43° in a vertical plane. Said angle can be translated into focal length of the image-acquisition elements 8, 8' themselves, which, for the angle indicated, becomes, for example, equal to 6 mm.

The image-acquisition elements 8, 8' are, for example, aligned to one another, parallel to the longitudinal axis A.

The system 1 further comprises a processing device 9, for example, in the form of a personal computer or of any other processor device provided with a processor or similar computing tool, operatively coupled to the first and second detection devices 7a, 7b, via an appropriate communication interface configured so as to implement a transfer of data, in a wired or preferably wireless mode (with any technique in itself known, for example Bluetooth or Wifi). As will be described in detail hereinafter, the processing device 9 is configured so as to process the two-dimensional images of the targets 5 supplied by the detection devices 7a, 7b, referred to the respective image reference systems, on the basis of an appropriate alignment algorithm, in order to determine the characteristics of orientation of the wheels 2 of the vehicle 3 and of alignment of the vehicle 3 itself in a single common reference system (for example, the one associated to the vehicle 3).

In particular, as will be illustrated in detail hereinafter, each detection device 7a and 7b contains inside it a smart processing unit, capable of executing, for each image-acquisition element 8, 8', a first processing of the images acquired of the targets 5, identifying some significant points on said images. This information, together with further information supplied by alignment sensors, which are also contained inside the detection devices 7a and 7b, is sent to the processing device 9 for implementation of the alignment algorithm.

As will be clarified hereinafter, according to a particular aspect of the present invention, to cause the detection devices 7a, 7b to provide proper framing of the targets 5 also in the case where the dimensions of the vehicle 3 differ substantially from the average ones (as regards, for example, the wheelbase and/or track) and/or to prevent in accurate positioning of the vehicle itself on the hydraulic ramp 4, or in general with respect to the measuring area, the first and second image-acquisition elements 8, 8' within each detection device 7a, 7b are mobile—in particular, they can be actuated jointly and simultaneously in an automatic way to execute a controlled rotation in the aforesaid horizontal plane by a movement unit integrated in the respective detection device 7a, 7b—in such a way as to vary the orientation of the respective optical aperture until the framing is optimal (in other words, in such a way as to adapt to, or follow, automatically the position of the respective targets 5). In this way, it is possible to vary the area of space framed in order to frame in an optimal way the respective target 5 (i.e., position, for example, the target 5 itself substantially at the centre of the viewing area V) as the position of the associated wheel 2 varies, on account, for example, of at least one from among: an approximate alignment of the vehicle 3 with respect to the hydraulic ramp 4; a variation of the wheelbase and/or track from vehicle to vehicle; or once again a variation in location of the wheel 2 internally or externally with respect to the track defined by the platforms 4a, 4b of the hydraulic ramp 4 (in a direction orthogonal to the longitudinal axis A, belonging to the horizontal plane).

Figure 3:
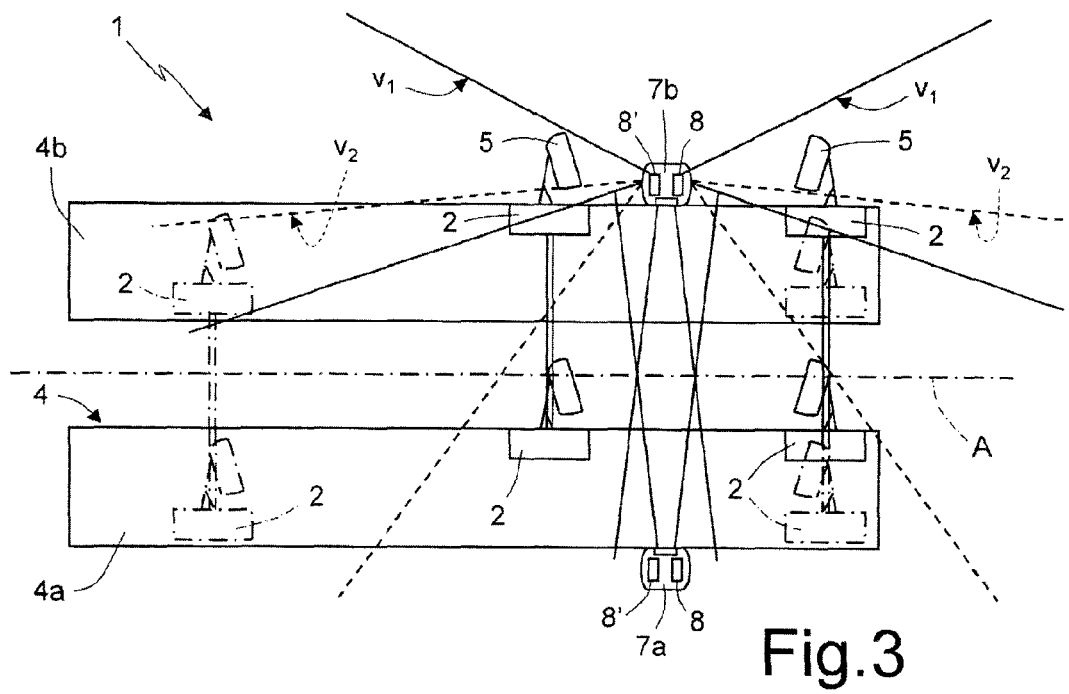
FIG. 3 shows the system of FIG. 1, in different operating conditions of measurement.

Advantageously, and as is shown schematically in FIG. 3, the controlled rotation of the image-acquisition elements 8, 8' is such as to enable, even when each of the two detection devices 7a, 7b are positioned in a fixed way with respect to the vehicle 3 (in particular, in a position rigidly constrained to the hydraulic ramp 4, or in any case alongside the area where the vehicle 3 is standing), framing of the targets 5 positioned on the wheels 2 in all the possible conditions of measurement, which range, for example, from the case of vehicle 3 with minimum wheelbase the wheels 2 of which are positioned on the outer edge of the track of the respective platform 4a, 4b (case shown with a solid line), to the case of vehicle 3 with maximum wheelbase the wheels 2 of which are positioned on the inner edge of the track itself (case shown with a dashed line), the outer edge being closer to the respective detection device 7a, 7b.

It is hence highlighted that the rotation of each image-acquisition element 8, 8' is not used for increasing the field of vision during the measurement (which can in fact be sufficiently wide on the basis of the focal length used and hence on the basis of the wide horizontal and vertical angle of vision characteristic of the optics used), nor is it used for supplying additional images to the image-processing procedure (given that said procedure does not require more than one image per target, as instead occurs in systems based upon stereo measurements).

In particular, FIG. 3 illustrates two possible positions of image-acquisition elements 8, 8', corresponding to which are respective viewing areas, designated by V1 and V2, which are the result of a controlled rotation of the image-acquisition elements 8, 8' themselves executed in order to continue to frame the targets 5 associated to the wheels 2 of the vehicle 3 even in conditions of measurement that are extremely different from one another (with respect to the positioning of the vehicle 3 on the hydraulic ramp 4). Once again in FIG. 3 there may moreover be noted the presence of purposely provided alignment sensors (described hereinafter), carried by each detection device 7a, 7b to frame the other device set in a facing position with respect to the longitudinal axis A.

In particular, the movement unit integrated in each detection device 7a, 7b can advantageously receive appropriate control signals from the outside, for example from the processing device 9, so as to orient automatically (i.e., without any intervention on the part of the user) the image-acquisition elements 8, 8' to frame the corresponding targets 5. The processing device 9, according to the processing of the images acquired (and to identification of the target elements 5'), is in fact able to establish the relative position of the target 5 with respect to the optical aperture of each image-acquisition element 8, 8', and consequently determine the required rotation to be imparted via the movement unit to frame the target itself in an optimal way. For example, an iterative process can be executed that envisages imparting successive rotations on the image-acquisition elements 8, 8' until one or more reference elements of the target 5'' are in a pre-set position in the image plane, indicating an optimal framing of the target 5.

Alternatively, the smart processing unit integrated in each detection device 7a, 7b can be itself able to execute a first processing of the images acquired, amongst other things so as to determine autonomously the rotations required in order to frame the corresponding targets 5 in an optimal way (for example, once again through identification of the position of specific target elements 5' in the image plane). In this case, the control signals for the displacement unit 10 are hence generated inside the detection devices 7a, 7b themselves.

Figure 4:
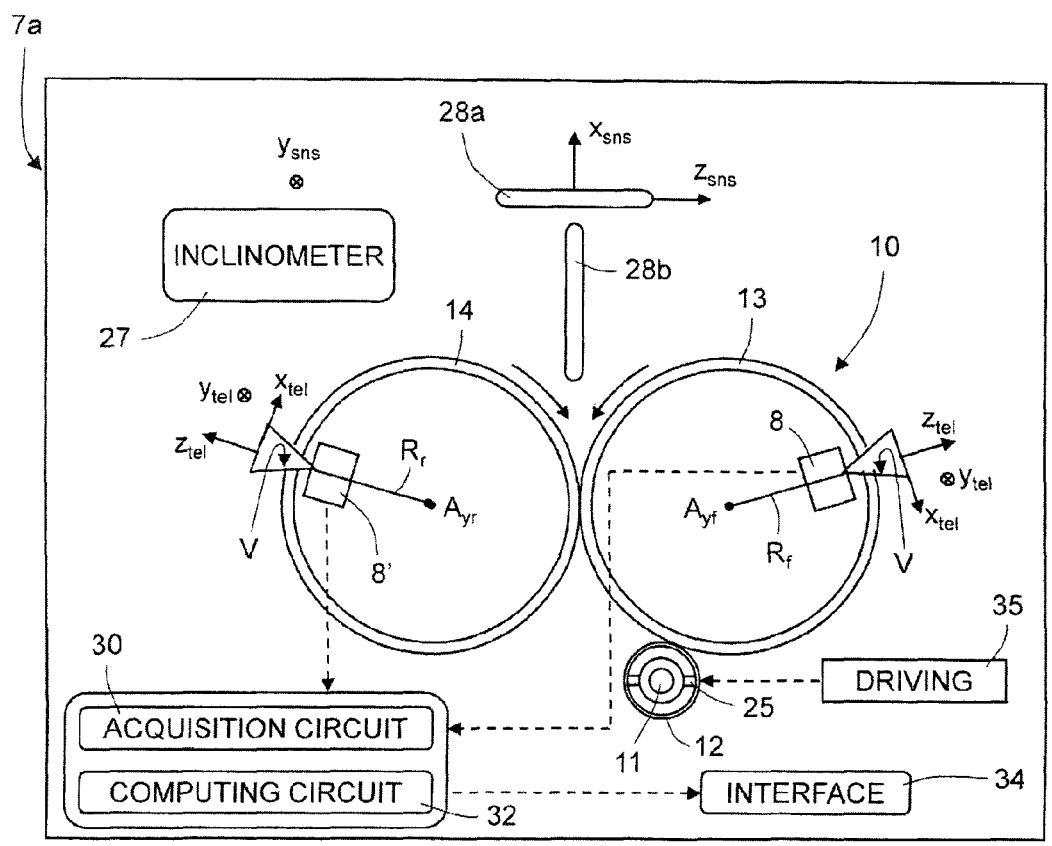
FIG. 4 is a schematic block diagram of a detection device in the system of FIG. 1.

As illustrated in FIG. 4, which shows schematically a single detection device (for example, the detection device 7a, but it is understood that altogether similar considerations apply to the detection device 7b), and in greater detail in the subsequent FIGS. 5a-5c and 6a-6b, the aforesaid movement unit, designated by 10, comprises:

a motor 11, for example a stepper motor, designed to impart the controlled rotation on the image-acquisition elements 8, 8';

a first gear 12, fitted on the shaft of the motor 11, and having a gear wheel with a first number n1 of teeth;

a second gear 13, meshing with the first gear 12 and having a second number n2 of teeth, greater than the first number n1 (for example, ten times said first number n1), and mechanically coupled to the first image-acquisition element 8 in such a way as to cause controlled rotation thereof as a function of the movement of the motor 11; and a third gear 14, having mechanical characteristics, and in particular number of teeth, equal to those of the second gear 13, and positioned so as to be in contact, and mesh with, the second gear 13 itself.

The third gear 14 is mechanically coupled to the second image-acquisition element 8' in such a way as to cause controlled rotation thereof as a function of the movement of the motor 11 and of rotation of the second gear 13. Given that the mechanical characteristics of the second and third gears 13, 14 are substantially identical, the first and second image-acquisition elements 8, 8' move, in use, by the same amount and undergo the same controlled rotation, rotating by the same angle in the horizontal plane.

In particular, a device reference system RefSys$_{sns}$ is defined associated to and fixed with respect to each detection device 7a, 7b, constituted by the horizontal axes x$_{sns}$ and z$_{sns}$ (which define the aforesaid horizontal plane), and by the vertical axis y$_{sns}$, orthogonal to said horizontal plane.

Likewise, the axes of rotation A$_{yf}$, A$_{yr}$ of the image-acquisition elements 8, 8' are defined (where the suffix "f" indicates the "front" position, whilst the suffix "r" indicates the "rear" position with respect to the longitudinal axis A), which are substantially orthogonal to the horizontal plane, and moreover defined are the radii of rotation $R_f$, $R_r$ associated to the image-acquisition elements 8, 8' themselves with respect to the corresponding axis of rotation $A_{yf}$, $A_{yr}$. It should be noted that the intersections of the aforesaid axes of rotation $A_{yf}$, $A_{yr}$ with the horizontal plane are aligned along the longitudinal axis A, as are the corresponding second and third gears 13, 14.

In addition, an image reference system $RefSys_{tel}$ is defined, which is associated to and fixed with respect to each image-acquisition element 8, 8', and is constituted by the horizontal axes $x_{tel}$ and $z_{tel}$, lying in the horizontal plane, and by the vertical axis $y_{tel}$, orthogonal to the horizontal plane. In particular, the axes $x_{tel}$ and $y_{tel}$ define the image plane associated to the two-dimensional images captured by the respective image-acquisition element 8, 8' (i.e., the plane in which the dimensions of the objects are evaluated in number of pixels), and the axis $z_{tel}$ coincides with the optical axis of the image-acquisition element 8, 8' itself (i.e., with the axis of symmetry of the respective viewing area, or optical aperture V).

In order to prevent any possible play between the aforesaid gears from causing a lack of repeatability between the movements of the image-acquisition elements 8, 8', and consequent errors of measurement, an aspect of the present invention envisages the use of play-recovery gears.

Figure 5A:
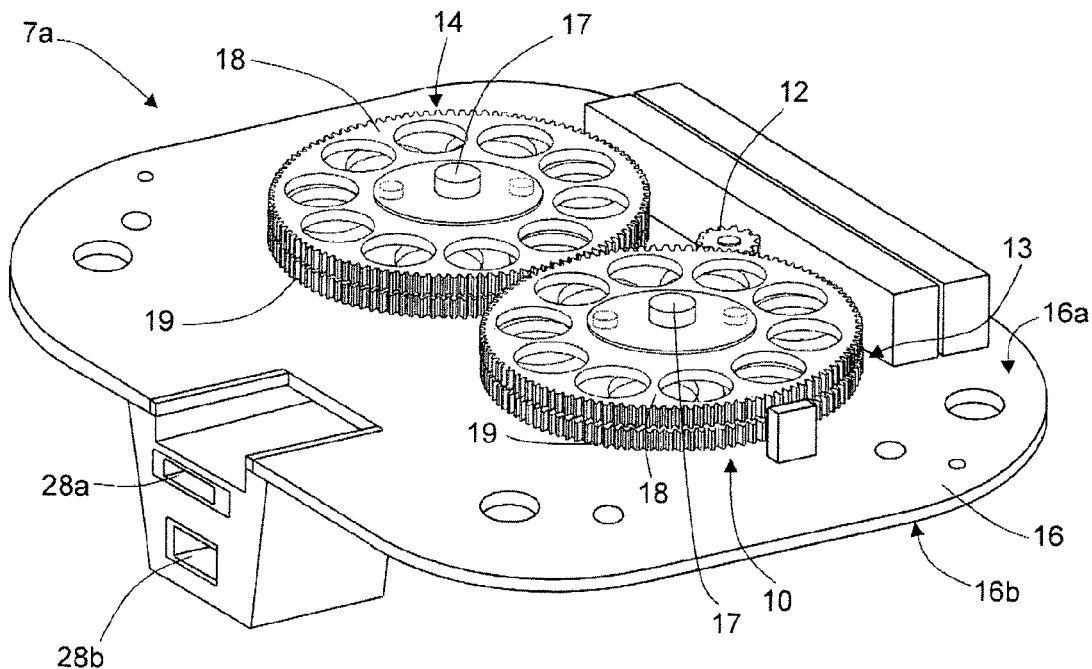
FIGS. 5a-5c show details of the detection device of FIG. 4, and of an associated movement unit.

In greater detail, as shown in FIG. 5a (which illustrates, from beneath, a portion of the detection device 7a, with parts removed for greater clarity), the displacement unit 10 is mechanically coupled to a base support 16 of the detection device 7a, for example, constituted by an aluminium plate. In particular, the first, second, and third gears 12, 13, 14 are set underneath the base support 16, on the side opposite to the image-acquisition elements 8, 8' with respect to the axis $y_{sns}$. In other words, the aforesaid gears are coupled to a bottom surface 16a of the base support 16, whilst the image-acquisition elements 8, 8' are set above a top surface 16b of the base support 16. The device reference system $RefSys_{sns}$ is, for example, fixed with respect to the base support 16.

Figure 5B:
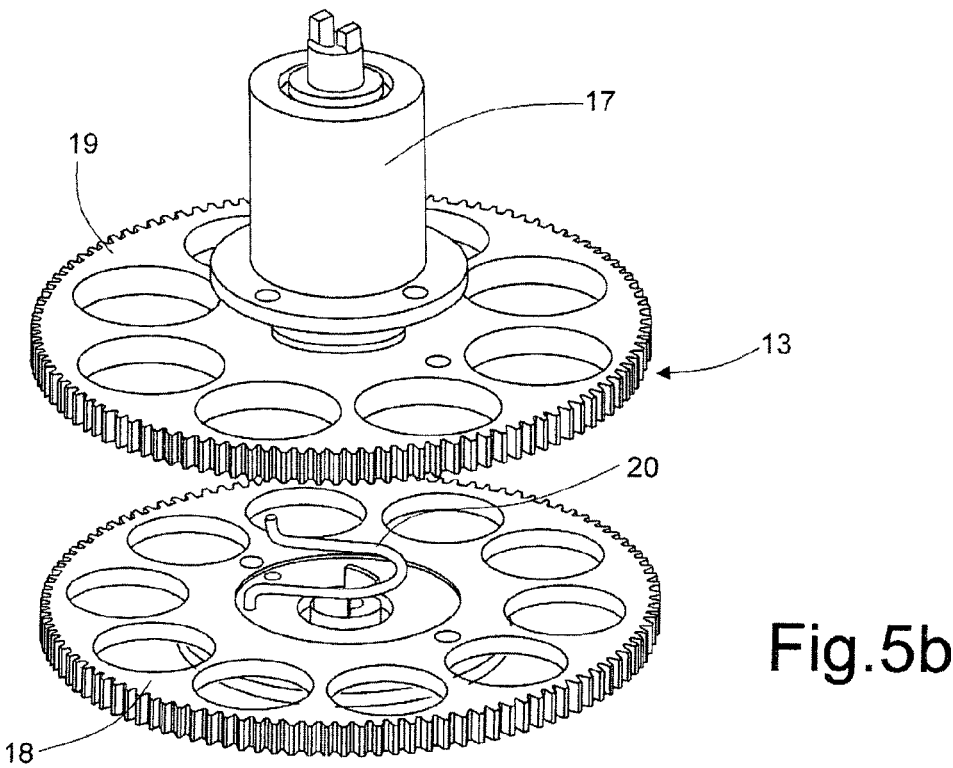

The second and third gears 13, 14, as may be seen also in FIG. 5b (which shows, by way of example, a detail of the second gear 13), are mounted in a rotatable way about a respective shaft 17, rigidly coupled to the base support 16.

In particular, each of the gears 13, 14 comprises: a pair of gear wheels 18, 19, which are fitted about one and the same shaft 17 so as to be superimposed vertically (in the direction of the axis of rotation) and have the same geometrical characteristics (amongst which the same diameter and the same number of teeth); and moreover an elastic bias element 20, including a spring, set between, and designed to couple mechanically, the gear wheels 18, 19. Each gear wheel 18, 19 of the pair associated to the second gear 13 is arranged so as to mesh with the corresponding gear wheel of the pair associated to the third gear 14.

In this way, even in the case where a first gear wheel of the pair (for example, the gear wheel 18) for some reason has a given play (for example, on account of the wear of the corresponding teeth), said play can be compensated, in use, by the second gear wheel (in the example, the gear wheel 19) of the same pair, which, by meshing in a correct way with the gear wheel associated thereto, is able to draw along, via the bias element 20, the first gear wheel, thus favouring recovery of the associated play.

With this arrangement, the second and third gears 13, 14 recover mutually any possible play, and at the same time also the play possibly present on the first gear 12, fitted on the shaft of the motor 11, is recovered.

Figure 5C:
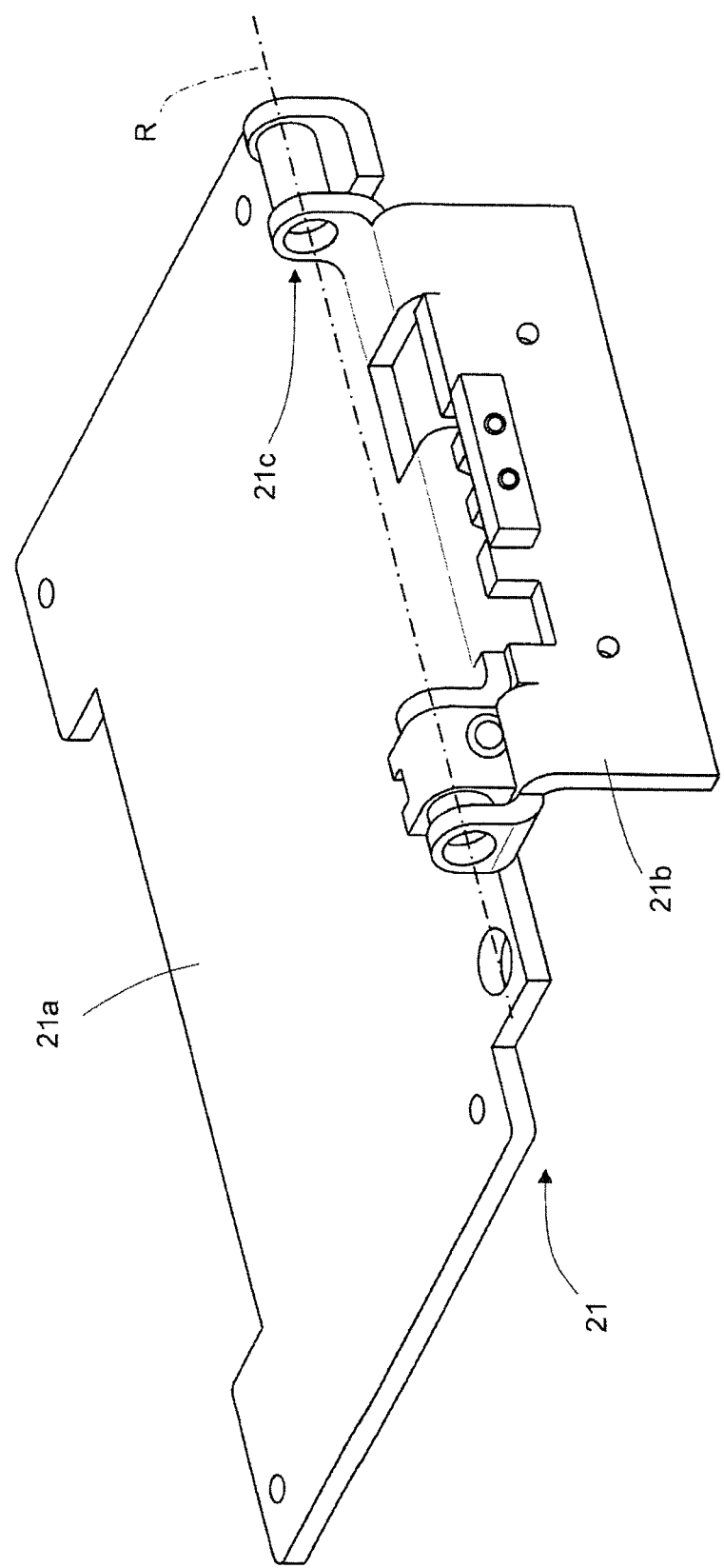

In addition, as illustrated in FIG. 5c, associated to the base support 16 of each detection device 7a, 7b is an engagement mechanism 21 for coupling to the hydraulic ramp 4. Said engagement mechanism 21 comprises: a coupling plate 21a, designed to couple, for example by means of screws or similar fixing elements, with the bottom surface 16a of the base support 16; and an engagement portion 21b, connected to the coupling plate 21a via a hinge 21c, and designed to be coupled to a respective platform 4a, 4b of the hydraulic ramp 4 in such a way that the horizontal plane of the base support 16 is substantially parallel to the plane of the platform itself. In particular, the hinge 21c enables a rotation of the base support 16, and of the corresponding detection device 7a, 7b, about an axis of rotation R defined by the hinge itself, towards the outside of the horizontal plane. It is thus possible to reduce the overall dimensions of the detection devices 7a, 7b with respect to the hydraulic ramp 4, when the procedure of alignment of the vehicle 3 is stopped. In addition, said rotation can guarantee the integrity of the detection devices 7a, 7b whenever, when the hydraulic ramp is lowered, an obstacle were to be encountered, which could otherwise damage the detection devices themselves in the case where they were rigidly fixed.

Figure 6A:
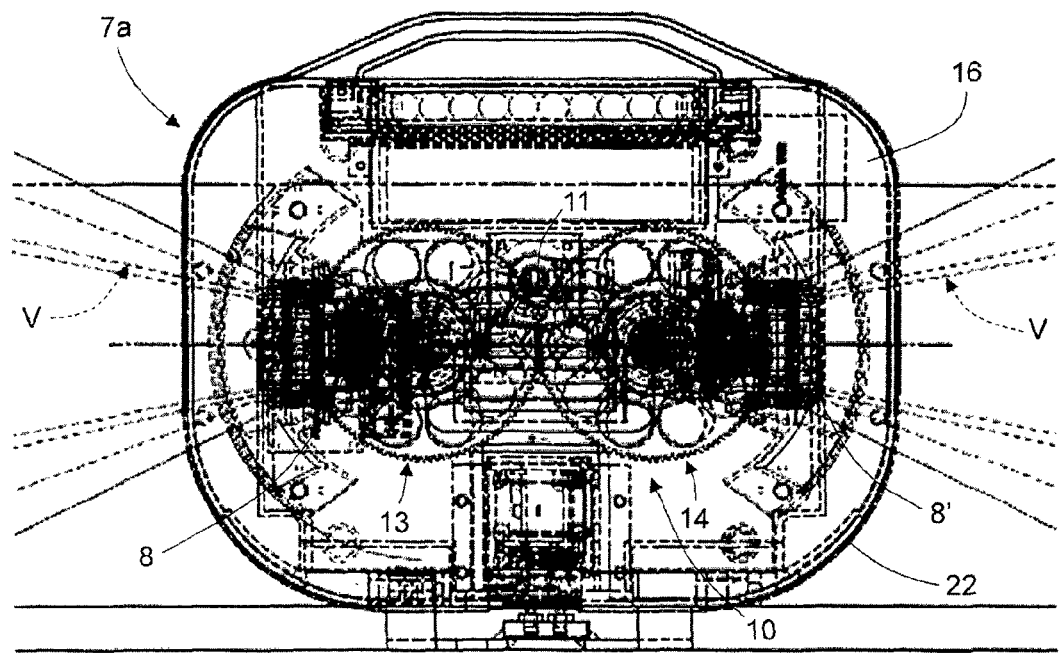
FIGS. 6a-6b illustrate in greater detail the production of the detection device of FIG. 4.
Figure 6B:
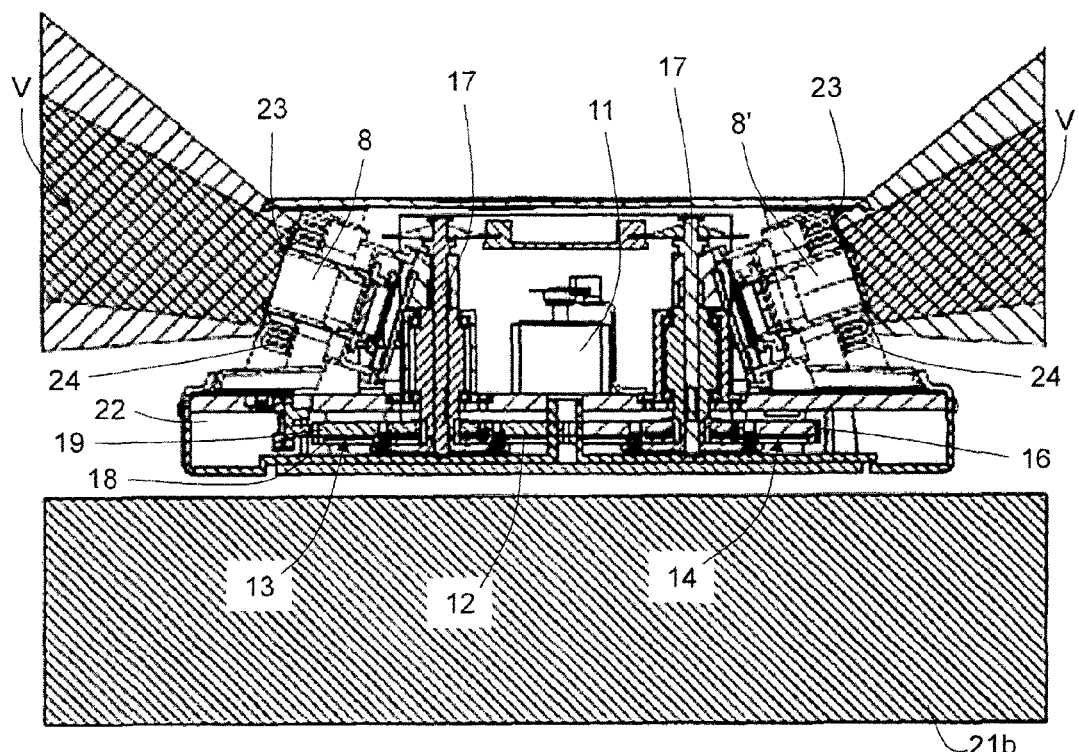

As highlighted in the detailed drawings of FIGS. 6a, 6b, which refer by way of example to a single detection device (for example, the detection device 7a, but altogether similar considerations apply for the other detection device 7b), the first and second image-acquisition elements 8, 8' are mechanically coupled to the shaft 17 respectively of the second and third gears 13, 14, in such a way as to be driven in rotation as a function of the rotations of the gears 13, 14 themselves. As shown in said figures, the optical aperture of the image-acquisition elements 8, 8' moreover presents a given non-zero inclination with respect to the horizontal plane.

Each detection device 7a, 7b has a casing 22, for example made of plastic material, which encloses the displacement unit 10, the associated image-acquisition elements 8, 8', and the base support 16. The casing 22 has, in a position corresponding to each image-acquisition element 8, 8' a purposely provided window 23 (in particular defining an opening, or else provided with a portion made of transparent material) in such a way as to not hinder the corresponding viewing area V. Advantageously, the particular arrangement of the displacement unit 10 and of the image-acquisition elements 8, 8' enables reduction of the vertical encumbrance of the casing 22 and in general of the detection device 7a, 7b.

As may be seen, for example, in FIG. 6b, moreover associated to each image-acquisition element 8, 8' is a purposely provided lighting element 24, for example including an array of LEDs operating in the infrared, such as to orient a light beam in the direction of the optical aperture of the image-acquisition element itself, coaxially thereto so as to enable acquisition of well-defined images even in conditions of poor environmental light. The wavelength of the radiation used for the lighting operation can in general be defined as a function of the target 5, and thus also its turning-on frequency; for example, a visible-light source, instead of an infrared one, can be used.

As illustrated schematically in the aforesaid FIG. 4 and for example in FIG. 5a, each detection device 7a, 7b further comprises purposely provided alignment sensors configured so as to make it possible, by means of appropriate operations of processing of the electrical signals detected (as will be discussed in detail hereinafter), to set in relation the reference systems of the detection devices 7a, 7b in order to define the mutual spatial arrangement thereof.

In detail, each detection device 7a, 7b comprises an encoder 25, operatively coupled to the rotation shaft of the motor 11, for detecting the angular position assumed by the image-acquisition elements 8, 8'. It should be noted that positioning of the encoder 25 on the shaft of the motor 11 enables increase in the precision of the reading, given the transmission ratio (given by the ratio n2/n1, for example equal to 10) between the angle of rotation of the shaft of the motor 11 and the angle of rotation of the image-acquisition elements 8, 8'. Alternatively, it is in any case possible to envisage the use of two encoders (or similar angular sensors), for measuring independently the rotation of the second and third gears 13, 14, and the associated rotation of the image-acquisition elements 8, 8'.

Each detection device 7a, 7b further comprises:

an inclinometer 27, fixed with respect to the casing 22, for determining the vertical rotations of the detection device 7a, 7b (and in particular the rotations performed outside the horizontal plane, about the axes $x_{sns}$ and $z_{sns}$);

a first image sensor 28a, for example of the CCD (Charge Coupled Device) type, having a horizontal extension along a given axis of the sensor (for example, along the axis $z_{sns}$), so as to enable detection of a horizontal rotation of the detection device 7a, 7b about the direction identified by the vertical axis $y_{sns}$, in particular according to the position of the detection device 7b, 7a, set on the other side of the vehicle 3 (the value of this angle of rotation contributes to defining the mutual rotation between the two detection devices 7a, 7b); and a second image sensor 28b, for example once again of the CCD type, having a vertical extension, orthogonal to the horizontal plane, for example along the axis $y_{sns}$, so as to detect the rotation of the detection device 7a, 7b about the axis $z_{sns}$.

The measurements supplied by the inclinometers 27 hence contribute to orienting the detection devices 7a, 7b in an absolute way in space, and moreover, advantageously, in a relative way with respect to one another, so that they can be rendered independent, for example, of the inclination assumed by the platforms 4a, 4b that make up the hydraulic ramp 4. The angles detected by the two pairs of image sensors 28a and 28b belonging to the detection devices 7a and 7b, together with the value of the distance between the detection devices 7a and 7b themselves detected by the first image sensors 28a (horizontal CODs), are moreover used for identifying any mutual sliding of the two detection devices 7a and 7b, respectively along the axes $Z_{sns}$ and $y_{sns}$ the mutual distance along the axis $x_{sns}$.

Figure 7:
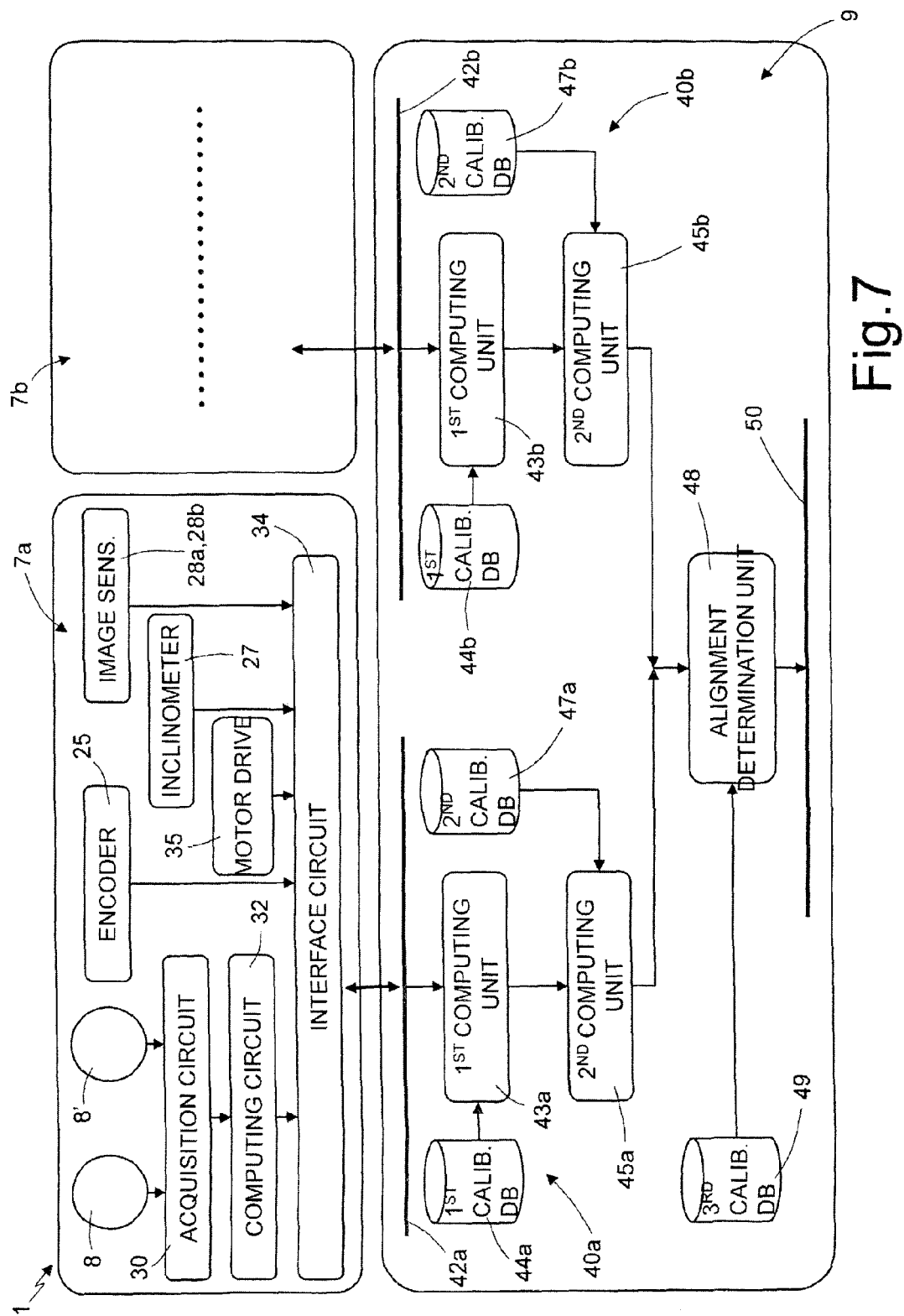
FIG. 7 is a functional block diagram of the system of FIG. 1.

Each detection device 7a, 7b further comprises (see once again FIG. 4 and moreover FIG. 7):

an electronic acquisition circuit 30, electrically coupled to the image-acquisition elements 8, 8' so as to receive the two-dimensional images acquired corresponding to the respective targets 5;

a computing circuit 32, including a microprocessor (or a similar computing tool), electrically coupled to the electronic acquisition circuit 30, and appropriately programmed for carrying out processing, of the so-called "low level" type, of the images acquired, in particular to identify and determine the dimensions in pixels of some two-dimensional items of information (for example, corresponding to the aforesaid target vectors), which will be then evaluated by the processing device 9 for identification of the orientation of the targets 5 and of the wheels 2 to which they are associated; for example, the computing circuit 32 detects the position of elements of the target 5', deemed significant, which identify, that is, in a pre-set way, the orthonormal triad associated to the target 5 itself, in particular to obtain the projections on the image plane of the target vectors themselves;

an electronic interface circuit 34, for interfacing with the processing device 9 through the communication interface (whether wired, for example with serial protocol, or wireless), and in particular for sending to the processing device 9 itself the output values of the alignment sensors present within the detection device 7a, 7b (inclinometer 27, encoder 25, and first and second image sensor 28a, 28b), and moreover the results of the low-level processing of the images carried out by the computing circuit 32; and a driving circuit 35, configured so as to drive appropriately the motor 11, as a function of purposely provided control signals received, for example, from outside the detection device 7a, 7b, in particular from the processing device 9 itself, via the electronic interface circuit 34.

Conveniently, the electronic acquisition circuit 30, the computing circuit 32, and the electronic interface circuit 34 (which define as a whole the smart processing unit inside each detection device 7a, 7b) can be integrated in a single printed-circuit board (not illustrated), appropriately coupled to the base support 16 within the casing 22 of the detection device 7a, 7b.

With reference once again to FIG. 7, the processing device 9, coupled externally to the detection devices 7a, 7b, comprises a first processing stage 40a and a second processing stage 40b, coupled, respectively, to the first detection device 7a and to the second detection device 7b.

Each processing stage 40a, 40b comprises: an interface unit 42a, 42b, configured so as to be coupled to the electronic interface circuit 34 of the respective detection device 7a, 7b in order to receive the information referred to previously, amongst which the results of the low-level processing of the images carried out by the computing circuit 32; and a first computing unit 43a, 43b, configured so as to execute an algorithm of conversion of the two-dimensional information received from the respective detection device 7a, 7b into angular and linear three-dimensional (3D) co-ordinates (corresponding to the geometrical characteristics of spatial orientation of the associated target 5) in the image reference system of each image-acquisition element 8, 8', as a function, amongst other things, of appropriate calibration parameters for each of the image-acquisition elements 8, 8' themselves, acquired during a preliminary calibration procedure (performed, for example, in the factory, at the end of the process of assembly of the detection devices 7a, 7b). The aforesaid calibration parameters are advantageously stored in a first calibration database 44a, 44b, within the processing device 9.

The processing device 9 further comprises a second computing unit 45a, 45b, operatively coupled to the first computing unit 43a, 43b, configured so as to execute an algorithm of conversion of the aforesaid angular and linear three-dimensional co-ordinates in the device reference system of each detection device 7a, 7b, as a function, amongst other things, of appropriate calibration parameters corresponding to the spatial relation between the image-acquisition elements 8, 8', acquired during the preliminary calibration procedure (carried out during manufacture and/or during installation of the system) and stored in a second calibration database 47a, 47b.

The processing device 9 further comprises an alignment-determining unit 48, which acquires at input the data generated at output by the second computing unit 45a, 45b (which are referred individually to the respective detection devices 7a, 7b), and converts the angular and linear three-dimensional co-ordinates into a single common reference system (for example, the reference system of the vehicle 3), as a function, amongst other things, of appropriate calibration parameters corresponding to the relation between the detection devices 7a, 7b (for example, in terms of the mutual spatial orientation). The calibration parameters are acquired during a preliminary calibration procedure carried out during installation of the system and stored in a third calibration database 49, and moreover acquired dynamically (i.e., during execution of the alignment measurements themselves) by means of the results of the measurements made by the alignment sensors located inside the detection devices 7a and 7b, as illustrated previously. The alignment-determining unit 48 is thus able to determine and present at output (via purposely provided display means 50) the results corresponding to alignment of the wheels 2 of the vehicle 3 (for example, in terms of the corresponding angles of convergence and camber).

As will now be described in detail, a particular aspect of the system 1 precisely avoids the need, during the measurement steps, for further procedures of calibration of the detection devices 7a, 7b, in so far as it envisages the use of the calibration parameters previously determined and stored (during manufacture and/or during installation) to set in relation the measurements made by the various image-acquisition elements. During the measurements, it is hence sufficient to make, in a dynamic way, appropriate corrections of the values detected, to take into account the relations between the various measurement elements determined during the aforesaid preliminary calibration procedure and possibly the measurements supplied by the aforesaid alignment sensors, so as to refer all the measurements to a single common reference system (for example, the one associated to the vehicle 3), within which the alignment results are referred.

In particular, within each detection device 7a, 7b, according to the images captured by the image-acquisition elements 8, 8' respective low-level images are processed (including a given restricted number of two-dimensional points). Said images are then interpreted, in the light of the calibration parameters of the image-acquisition elements 8, 8' themselves, to trace back to the position and orientation of the targets 5 in the reference system of each image-acquisition element 8, 8' that observes it (thus obtaining the information of orientation and position of the targets 5 in four different reference systems). The purpose of the various alignment sensors (amongst which the inclinometer 27 and the image sensors 28a, 28b), which are present inside the detection devices 7a, 7b is precisely to enable conversion of the measurements into a single common reference system, by means of an appropriate calibration procedure.

Figure 8:
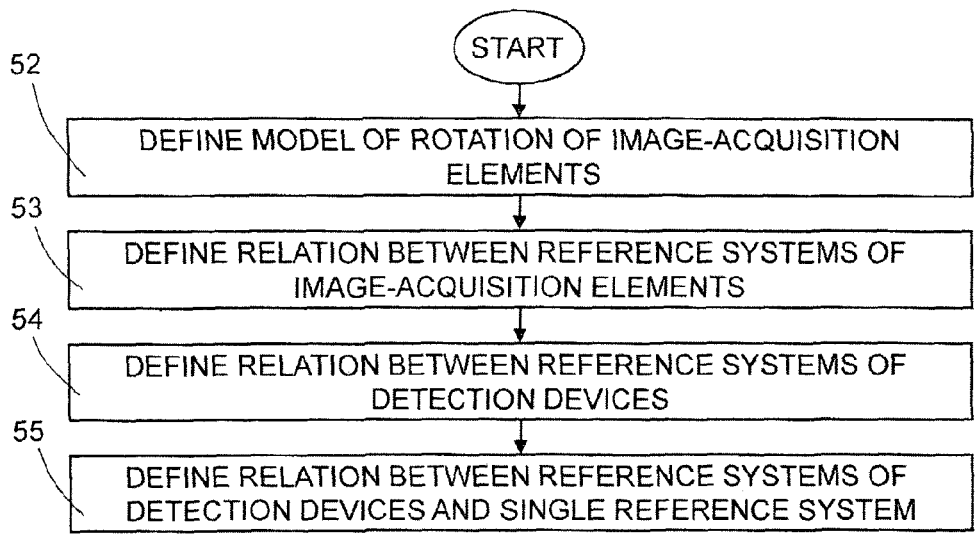
FIG. 8 shows a flowchart for a calibration procedure in the system of FIG. 1.

In general, a first step 52 of the calibration procedure (see FIG. 8), envisages definition of the axes of rotation $A_{yf}$, $A_{yr}$ for each image-acquisition element 8, 8' and moreover of the radii of rotation $R_r$, $R_f$ associated to the image-acquisition elements 8, 8' themselves with respect to the corresponding axis of rotation $A_{yf}$, $A_{yr}$. Namely, defined in said step 52 is the model of rotation that describes and defines the rotation of the two image-acquisition elements 8, 8' of each detection device 7a, 7b.

Next (step 53), the calibration procedure envisages setting in relation the image reference systems $RefSys_{rel}$ of the two image-acquisition elements 8, 8' with one another and with respect to the device reference system $RefSys_{sns}$ of the corresponding detection device 7a, 7b, using the angles supplied by the inclinometer 27 and by the first image sensor 28a when the two image-acquisition elements 8, 8' are in a given known reference position. During the measurements, as the angle of rotation of the image-acquisition elements 8, 8' themselves varies, this relation may be easily updated in a dynamic way, using the models of rotation defined in step 50.

It should be noted that said calibration steps enable identification of the possible "off centre" in the coupling between the gears that might result in different values of angular rotation performed by the gears 13, 14 with respect to the nominal values given by the ratio of the teeth of the corresponding gear wheels. Given that said error is repeatable, the calibration procedure hence makes it possible to take it into account, by using purposely provided calibration parameters.

Then, step 54, the image-acquisition elements 8, 8' belonging to one detection device 7a are set in relation with those belonging to the other detection device 7b by setting in relation with one another the device reference systems $RefSys_{sns}$ of the respective detection devices 7a, 7b.

Next (step 55), the relations of calibration are defined between the reference systems of the respective detection devices 7a, 7b and the single reference system $RefSys_{COMMON}$, for example that of the vehicle 3, within which the results of the angular and linear measurements corresponding to the alignment of the vehicle 3 will be displayed (for example, in terms of the angles of convergence and camber of the wheels 2).

Figure 9A:
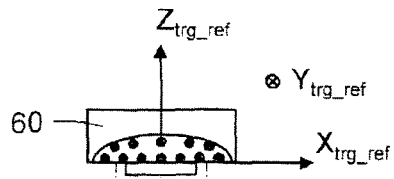
FIGS. 9a-9c show geometrical quantities associated to the calibration procedure of FIG. 9.

In greater detail, and with reference first to FIG. 9a, in the aforesaid step 52, the measurements of the inclinometer 27 (which is shown in the aforesaid FIG. 9a as including a first measurement element 27a and a second measurement element 27b, which are designed to supply respective values of rotation about the horizontal axes $x_{sns}$ and $z_{sns}$) and of the image sensors 28a, 28b are set to zero. Then, the image-acquisition elements 8, 8' are set in a respective first angular position designated by pos1; for example (see also FIG. 3), said first angular position pos1 corresponds to a pre-set reference position, for instance, to a limit angular position for enabling framing of the targets 5 applied to the wheels 2 of a vehicle 3 provided with minimum wheelbase/track (said position is hence pre-set and known beforehand).

It should be noted that associated to the rotations of the image-acquisition elements 8, 8', imparted by the displacement unit 10, are the angles of rotation $\theta_{fi}$ and $\theta_{ri}$ (where the suffixes "f" and "r" indicate once again the front position or rear position of the corresponding image-acquisition element 8, 8'), referred to the axis $z_{sns}$ of the device reference system $RefSys_{sns}$ of the corresponding detection device 7a.

After the measurement has been made in said first angular position, the image-acquisition elements 8, 8' are rotated through a given angle of rotation $\theta_{f2}$, $\theta_{r2}$ (see also FIG. 9b) such that the image-acquisition elements 8, 8' themselves will reach a second angular position, designated by pos2, which still guarantees visibility of the respective targets 5.

The results of the measurements in said second angular position pos2 enable determination of the vectors $Vt_{f2}$ and $Vt_{r2}$, which describe the vector displacements of the image-acquisition elements 8, 8' themselves as a result of the rotation through the angle of rotation $\theta_{f2}$, $\theta_{r2}$, and moreover the matrices of rotation $matRot_{f(2-1)}$ and $matRot_{r(2-1)}$ that rotate the reference systems of the image-acquisition elements 8, 8' themselves passing from the first angular position (pos1) to the second angular position (pos2).

Figure 9B:
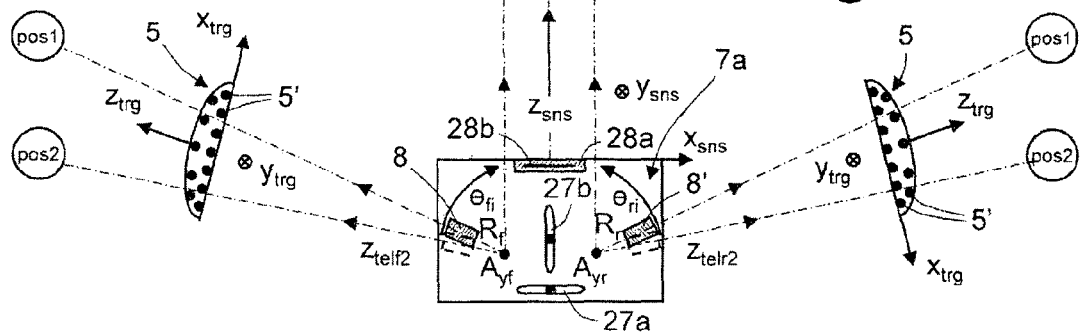
Figure 9B:
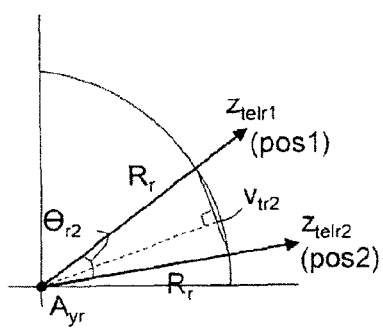

In particular, from FIG. 9b, it emerges that the following expressions apply for the radii of rotation Rf, Rr $$R_f = (Vt_{f2}/2)/\sin(\theta_{f2}/2)$$

$$R_r = (Vt_{r2}/2)/\sin(\theta_{r2}/2)$$

In addition, if $z_{telf1} = z_{telr1} = \{0, 0, 1\}$ is the axis $z_{tel}$ of the image-acquisition elements 8, 8' in the first angular position (pos1) (it should be recalled that said axis coincides with the optical axis of the image-acquisition elements 8, 8'), the axis $z_{tel}$ of the image-acquisition elements 8, 8' themselves in the second angular position (pos2) can be expressed as $$z_{telf2} = z_{telf1} * \text{matRot}_{f(2-1)}$$

$$z_{telr2} = z_{telr1} * \text{matRot}_{r(2-1)}$$

At this point, it is possible to define the two axes of rotation $A_{yf}$, $A_{yr}$ of the image-acquisition elements 8, 8' via the following expressions $$A_{yf} = z_{telf1} \times z_{telf2}$$

$$A_{yr} = z_{telr1} \times z_{telr2}$$

where the symbol "×" indicates the operation of cross product.

In the next step 53, the calibration procedure envisages, as indicated previously, setting in relation the reference systems of the two image-acquisition elements 8, 8' with one another and with respect to the axis $z_{sns}$ of the reference system of the corresponding detection device 7a in the first angular position pos1 (using, amongst other things, the measurements of the inclinometer 27 and of the first image sensor 28a).

Figure 9C:
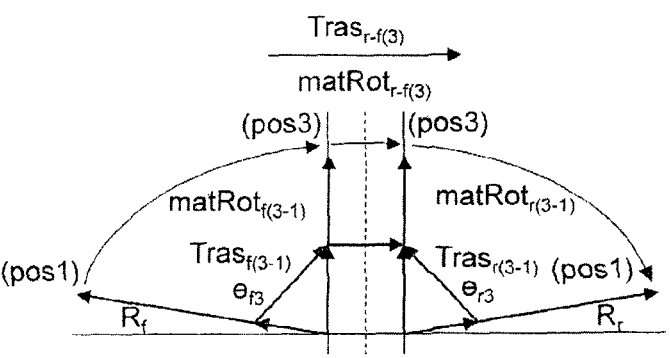

In particular, with reference once again to FIG. 9a and moreover to FIG. 9c, the two image-acquisition elements 8, 8' are rotated through a given angle of rotation $\theta_{f3}$, $\theta_{r3}$, starting from the first angular position pos1 rotating in a direction opposite with respect to the rotation corresponding to the second angular position pos2 so as to reach a third angular position pos3, in which they are both able to frame a reference target 60 having a reference system $x_{trg\_ref}$, $y_{trg\_ref}$, $z_{trg\_ref}$ of its own.

The reference target 60 is configured in such a way that, when the angle read by the first image sensor 28a is equal to zero, the axis $z_{ref\_trg}$ coincides with the axis $z_{sns}$ of the reference system associated to and fixed with respect to the detection device 7a (which moreover constitutes the reference axis for the angular rotations $\theta_{fi}$ and $\theta_{ri}$).

It is thus possible to define the relation between the reference systems of the image-acquisition elements 8, 8' in the third angular position pos3 and the reference system of the reference target 60, determining the orientation of the reference target 60 by means of acquisition and processing of the images acquired by the image-acquisition elements 8, 8'. In addition, given that the relation between the reference system of the reference target 60 and that of the detection device 7a is known (for constructional and design reasons), at the end of said step the relation between the image reference system RefSys$_{tel}$ of the image-acquisition elements 8, 8' in the aforesaid third angular position pos3 and the device reference system RefSys$_{sns}$ of the detection device 7a is moreover defined.

For generic values of the angular rotations $\theta_{fi}$ and $\theta_{ri}$, it will be sufficient to set in relation the reference systems of the image-acquisition elements 8, 8' with the corresponding reference systems assumed for the angle of rotation $\theta_{f3}$, $\theta_{r3}$ (which in turn has been set in relation with the reference system of the detection device 7a).

In detail (see also FIG. 9c), the rotation undergone by the first image-acquisition element 8 (set in a front position) can be described by defining the matrix of rotation matRot$_{f(3-1)}$ that is a function of: $(-\theta_{f3}, A_{yf})$; whilst its translation can be expressed, with evident geometrical considerations, as $$\text{trans}_{f(3-1)} = \{0,0,R_f\} * \text{matRot}_{f(3-1)} - \{0,0,R_f\}$$

Likewise, the rotation undergone by the second image-acquisition element 8' (set in a rear position) can be described by defining the matrix of rotation matRot$_{r(3-1)}$ that is a function of: $(-\theta_{r3}, A_{yr})$; as likewise its translation can be expressed as $$\text{trans}_{r(3-1)} = \{0,0,R_r\} * \text{matRot}_{r(3-1)} - \{0,0,R_r\}$$

Moreover, having measured the reference target 60 using both of the image-acquisition elements 8, 8', it is possible to define the matrix matRot$_{r-f(3)}$ that defines the rotation between one image-acquisition element and the other in the third angular position pos3, and the translation vector trans$_{r-f(3)}$ that links the origins of the two image-acquisition elements 8, 8' (i.e., the position of the corresponding axes of rotation $A_{yf}$, $A_{yr}$); all this defines the relation between the reference systems of the first and second image-acquisition elements 8, 8' in the third angular position pos3.

The calibration procedure is completed by defining the matrix of rotation $$\text{matRot}_{r-f(1)} = \text{matRot}_{r(1-3)} * \text{matRot}_{r-f(3)} * \text{matRot}_{f(3-1)}$$

and the translation vector $$\text{trans}_{r-f(1)} = \text{trans}_{r(1-3)} + \text{trans}_{r-f(3)} + \text{trans}_{f(3-1)}$$

that describe the function of roto-translation used for converting the vectors measured by the second (rear) image-acquisition element 8' in the reference system defined by the first (front) image-acquisition element 8, when both of the image-acquisition elements 8, 8' are in the first angular position post.

During the measurement steps subsequent to the calibration step previously described, for different values of the angular rotations $\theta_{fi}$ and $\theta_{ri}$, it will be sufficient to apply, for both of the image-acquisition elements 8, 8', further rototranslation matrices, which will be a function of the specific angles of rotation each time measured $(\theta_{fi} - \theta_1; \theta_{ri} - \theta_1)$ and of the axes of rotation $A_{yf}$ and $A_{yr}$. In other words, it will be sufficient to use appropriate corrective factors based upon the calibration parameters stored during the preliminary calibration procedure and upon the current values measured.

In addition, once again during the measurement steps, the axes of rotation $A_{yf}$ and $A_{yr}$, orthogonal to the horizontal plane $(z_{tel} x_{tel})$ of each image-acquisition element 8, 8' (calculated in the calibration step when the values of inclination returned by the inclinometer 27 and by the first image sensor 28a are zero, but for a negligible factor $\epsilon$) will be corrected by rotating about the axis $z_{sns}$ and $x_{sns}$ by the current values of inclination read by the measurement elements 27a, 27b of the inclinometer 27, and about the axis $y_{sns}$ by the angle read by the first image sensor 28a. Also the rototranslation matrices themselves (which are a function of the angular rotations $\theta_{fi}$ and $\theta_{ri}$ and of the position of the axes of rotation $A_{yf}$ and $A_{yr}$) identified in calibration on the same hypothesis as regards the values, which are substantially zero, of the angular measurements, will be appropriately corrected, in a way in itself evident, with the current values read by the aforesaid sensors.

The advantages of the system for determining the alignment of the wheels of a vehicle according to the invention emerge in an evident way from the foregoing description.

In particular, the configuration of the detection devices 7a, 7b enables measurement of the characteristics of alignment of vehicles 3 also set in an asymmetrical way on the hydraulic ramp 4, and with dimensions of wheelbase and/or track that are even markedly different from one another. In fact, the presence of the displacement unit 10 associated to the image-acquisition elements 8, 8' enables automatic and dynamic adaptation of the viewing area V of the image-acquisition elements 8, 8' themselves in such a way as to frame the targets 5 associated to the wheels 2 of the vehicle 3, as a function of the positioning of the vehicle 3 itself on the hydraulic ramp 4. In particular, it is possible to guarantee framing of the targets 5, and to be able to distinguish the elements of the targets themselves i, starting from the shortest distance up to the maximum distance envisaged between the fixed position of the detection devices 7a, 7b and the variable position of the wheels 2, continuing to maintain framing also during considerable steering of the wheels 2 themselves (for example, with steering angles equal to 47°).

The presence of purposely provided alignment sensor elements (inclinometers and image sensors) on board each detection device 7a, 7b makes it possible to set in relation with one another the measurements made by the detection devices 7a, 7b in a dynamic way, during execution of the measurements (enabling, amongst other things, compensation of possible deformations of the hydraulic ramp 4). In particular, advantageously, there are not required further operations of calibration during, or preliminarily, to the operations of measurement, in so far as the procedure of calibration of the detection devices and of the associated system has already been performed in the factory. There is hence not necessary a calibration procedure during installation, even if it is possible to allow the user to carry out a verification procedure for controlling that the system continues to be correctly calibrated after it has undergone possible damage (such as impact). In a normal situation, instead, during the measurement step, it is sufficient to apply purposely provided corrective factors as a function of the measurements returned by the alignment devices (inclinometer 27 and image sensors 28a, 28b) for the rotations executed by the image-acquisition elements 8, 8', and of the calibration parameters stored during the calibration carried out in the factory.

The outer dimensions of the casing 22 of the detection devices 7a, 7b are advantageously limited (thanks to the particular arrangement of the components, and in particular to the arrangement of the gears underneath the base support 16 and to the limited complexity thereof), with an encumbrance that does not represent an obstacle during execution of the measuring operating procedures. The top part of the casing 22 does not hinder opening of the doors also for vehicles 3 with a floor panel having a low height from the resting surface, whilst the transverse dimensions do not constitute an obstacle in the working space in which the measuring procedures are carried out. Moreover, the modes of engagement and disengagement of the detection devices 7a, 7b themselves with respect to the hydraulic ramp 4 are simple and fast to perform.

As on the other hand has been pointed out in the aforesaid patent application No. PCT WO2011/138662, it is emphasized once again that the use of three-dimensional targets 5 (in particular constituted by a three-dimensional configuration of target elements), and in particular the use of target elements 5' which are also three-dimensional, enables determination of the absolute position and orientation of each target (and of the wheel 2 to which the target itself is coupled), with respect to a fixed reference system, in a precise and safe way using a single image-capturing element, without it being necessary to move the vehicle or the wheels of the vehicle to determine the spatial location of the targets (for example, to move the vehicle forwards and backwards, the so-called "run-out" operation), displace the targets, or resort to the use of a stereo acquisition system. In fact, it is convenient to determine in the space a triad of orthogonal axes associated to each target 5 (identifying target reference elements 5" thereof), and in this way determine the spatial orientation of the target itself within a given reference system. In other words, advantageously, intrinsically associated to the target is a three-dimensional information, via which it possible to determine the spatial orientation thereof starting from processing, in each individual processing range, also of a single two-dimensional image (transforming, thanks to the particular geometrical structure of the target, the two-dimensional information supplied by the image-capturing device into three-dimensional information).

In particular, thanks to the use of three-dimensional target elements with characteristics of isotropy, spherical shape, the accuracy of the measurement remains unvaried as the inclination of the targets with respect to the image reference system of the image-capturing elements 8, 8' varies. The spherical structural symmetry of the targets 5 used moreover makes it possible to return the angular values by interpolation even when some target elements 5', which constitute the structure thereof, are partially covered.

Consequently, the use of the detection devices 7a, 7b provided with the displacement unit 10 associated to the image-acquisition elements 8, 8', together with the use of three-dimensional targets, enables provision of a measurement system that is simple to install and use, particularly advantageous as regards the operations of image processing required for measuring the angles of alignment.

Finally, it is clear that modifications and variations may be made to what is described and illustrated herein, without thereby departing from the scope of the present invention, as defined in the annexed claims.

In particular, it is once again emphasized that the detection devices 7a, 7b can be set alongside the hydraulic ramp 4 and the vehicle 3 to be characterized, without being set in contact with the hydraulic ramp 4 itself (for example, by being carried by respective fixed positioning structures, not illustrated in the figures).

In general, it is evident that the targets 5 can have a different three-dimensional conformation, in any case such as to enable definition of vector quantities set according to a known three-dimensional arrangement, in particular so as to enable identification of a triad of orthogonal axes associated thereto (for example, by identifying significant points or planes on the targets themselves), preferably from different viewing angles (for example, in an angular range comprised between −30° and +30°).

One or more of the targets 5 can moreover be replaced by targets of an active type, i.e., constituted by target elements that, instead of reflecting an incident radiation, are able themselves to generate and emit an electromagnetic radiation, in the range of the visible, or, alternatively, in the field of the infrared.

Finally, in an evident way, the system and method described enable determination of the spatial orientation also of a single pair of wheels 2 of the vehicle 3 (set on the same side with respect to the longitudinal axis A), said image being filmed by a single detection device 7a or 7b.

The invention claimed is:

1. A first detection device for a system for determining the orientation of at least one first wheel and one second wheel of a vehicle under examination in a measuring area, said wheels being arranged on a first side of said vehicle with respect to a longitudinal axis thereof, said device being configured to be arranged laterally with respect to said vehicle on said first side with respect to said longitudinal axis, in a position set between said first and second wheels, and including a first image-acquisition element and a second image-acquisition element, having a respective viewing area and being configured to acquire images respectively of a first target and a second target coupled, respectively, to said first and second wheels, a displacement unit, operatively coupled to said first image-acquisition element and second image-acquisition element, and configured to jointly rotate said first image-acquisition element and said second image-acquisition element through a same angle of rotation so as to adapt automatically their viewing area to the position, respectively, of the first target and of the second target, according to different values of track and/or wheelbase of the vehicle and/or to a different positioning thereof in the measuring area.

2. The device according to claim 1, wherein said first detection device is configured to be set in a fixed way with respect to said vehicle, and said first and second wheels lie in a horizontal plane; said displacement unit being configured to cause a rotation of said first image-acquisition element and second image-acquisition element in said horizontal plane such as to enable said first and second image-acquisition elements to view said first and second targets independently of a displacement of said first and second wheels along, or transverse to, said longitudinal axis.

3. The device according to claim 1, wherein axes of rotation of said first and second image-acquisition elements are aligned to one another parallel to said longitudinal axis.

4. The device according to claim 1, wherein said displacement unit includes a motor and a pair of gears mechanically coupled to said first and second image-acquisition elements and driven in rotation by said motor; said gears being arranged to engage with one another in order to rotate substantially through said same angle of rotation upon actuation by said motor.

5. The device according to claim 4, wherein said displacement unit includes a motor gear, fitted on a rotation shaft of said motor and set so as to engage with a given gear of said pair so as to drive it in rotation.

6. The device according to claim 4, wherein the gears of said pair have play compensation, each gear of the pair including, a first gear wheel and a second gear wheel, mechanically coupled to one another by an elastic biasing element and designed to engage with a respective gear wheel of the other gear of the pair of gears; deformation of said elastic biasing element being such as to enable recovery of any play associated to said first and/or second gear wheels.

7. The device according to claim 4, comprising a casing inside which a base support is arranged; said gears being set on a bottom surface of said base support, and said first and second image-acquisition elements being set on a top surface of said base support, opposite to said bottom surface; wherein said first and second image-acquisition elements are rigidly coupled to a respective rotation shaft of a respective one of said gears.

8. The device according to claim 4, further comprising an electronic unit including: an acquisition and processing circuit, for acquisition of said images and execution of a first processing of said images aimed at identifying pre-set geometrical parameters of said targets; and a driving circuit for driving said motor, designed to receive control signals and to control said motor accordingly for executing desired rotations of said first and second image-acquisition elements as a function of said control signals.

9. The device according to claim 1, comprising a base support coupled to which are said first and second image-acquisition elements, and associated to which is a first device reference system; wherein associated to said first and second image-acquisition elements are, respectively, a first image reference system and a second image reference system, within which said first and second image-acquisition elements are configured to acquire said respective images; further comprising alignment sensor elements configured to enable definition of the device reference system and to establish a relation between the first and second image reference systems and the device reference system.

10. The device according to claim 9, wherein said alignment sensor elements include: a rotation angle detector, configured to enable detection of an angle of rotation of said first and second image-acquisition elements in the device reference system about an axis orthogonal to the base support; at least one inclinometer, configured to enable detection of vertical rotations of said device reference system with respect to a horizontal plane belonging to an external reference system; and at least one image sensor, configured to view an external reference device and enable determination of a relative position of said first detection device with respect to said external reference device.

11. A system for determining the orientation of at least one first wheel and one second wheel of a vehicle, said wheels being arranged on a first side of said vehicle with respect to a longitudinal axis thereof, comprising:
a first target and a second target, coupled, respectively, to said first and second wheels;
a first detection device, according to claim 1; and
a processing device, operatively coupled to said first detection device and configured to determine characteristic angles of orientation of said first and second wheels as a function of a single image acquired for each of said first and second wheels, respectively by said first and second image-acquisition elements of said first detection device.

12. The system according to claim 11, wherein said processing device is configured to generate, based on the processing of said single image acquired for each of said first and second wheels, control signals for controlling said displacement unit of said first detection device so as to rotate said first and second image-acquisition elements through said same angle of rotation.

13. The system according to claim 11, wherein said vehicle is arranged on a hydraulic ramp, defining said measuring area, and said first detection device is rigidly fixed to said hydraulic ramp, laterally with respect to said vehicle.

14. The system according to claim 11, wherein said first and second targets have a three-dimensional conformation designed to define geometrical quantities set according to a known three-dimensional arrangement, and each comprise a plurality of target elements, which have a three-dimensional conformation and are arranged with respect to one another according to a three-dimensional distribution, at least some of them in positions mutually linked by a known geometrical relation such as to define said geometrical quantities.

15. The system according to claim 14, wherein said target elements are arranged with respect to one another according to a three-dimensional distribution designed to define an orthogonal triad of target vectors defining a reference system associated to said first or second targets.

16. The system according to claim 14, wherein said first and second targets comprise a respective supporting structure defining internally a concave spherical surface; and wherein said target elements are mechanically coupled to said supporting structure and arranged on said spherical surface to form said three-dimensional distribution.

17. The system according to claim 11, wherein said first detection device comprises alignment sensors and a base support coupled to which are said first and second image-acquisition elements; and wherein said processing device comprises a memory storing calibration parameters, and is configured for receiving measurements from said alignment sensor elements so as to define, as a function of said measurements and of said calibration parameters, a first device reference system associated to the base support of said first detection device and to establish a relation between a first and a second image reference systems wherein said first and second image-acquisition elements are designed to acquire said respective images, and the first device reference system.

18. The system according to claim 17, further comprising: a second detection device arranged laterally with respect to said vehicle on a second side of said vehicle, opposite to said first side with respect to said longitudinal axis, in a position set between a third wheel and a fourth wheel of said vehicle set on said second side; and a third target and a fourth target, coupled respectively to said third and fourth wheels, said second detection device being configured to acquire images of said third and fourth targets; wherein said processing device is operatively coupled to said first and second detection devices and is configured to determine, as a function of said images, said orientation and a mutual alignment, of said first, second, third, and fourth wheels; said processing device being further configured to set in relation, as a function of said measurements and of said calibration parameters, said first device reference system with a second device reference system, associated to said second detection device, and said first and second device reference systems with a common reference system, associated to said vehicle, wherein the information of orientation and mutual alignment of said wheels are processed.

19. The system according to claim 18, wherein said alignment sensor elements include: at least one image sensor configured to frame a respective image sensor of said second detection device; said processing device being configured for processing measurements made by the image sensors of said first and second detection devices so as to determine a relative position of said first detection device with respect to said second detection device.

20. A method for calibration of a detection device according to claim 1, comprising:
defining a model of displacement for each of said first and second image-acquisition elements during displacement by said displacement unit;
defining a relation between respective image reference systems associated to said first and second image-acquisition elements, with respect to a device reference system associated to said detection device; and
storing a series of calibration parameters associated to said models of displacement and to said relation between the respective image reference systems, said step of defining a relation comprising: positioning said first and second image-acquisition elements In pre-set angular positions, and moreover causing said first and second image-acquisition elements to view one and the same reference target having a pre-set conformation and a pre-set geometrical relation with respect to said detection device.

* * * * *